Dec. 30, 1969 N. N. PERSKY 3,486,704
APPARATUS FOR SCRAP METAL REDUCTION
Filed Aug. 27, 1965 5 Sheets-Sheet 1

Inventor:
Nathan N. Persky
By Hofgren, Wegner, Allen,
Stellman & McCord
Attorneys

Dec. 30, 1969        N. N. PERSKY        3,486,704
APPARATUS FOR SCRAP METAL REDUCTION
Filed Aug. 27, 1965        5 Sheets-Sheet 5

United States Patent Office 3,486,704
Patented Dec. 30, 1969

3,486,704
APPARATUS FOR SCRAP METAL REDUCTION
Nathan N. Persky, Independence, Kans., assignor of one-half each to The Purdy Co., a corporation of Illinois, and Sharonized Steel Co., a corporation of Kansas
Continuation-in-part of application Ser. No. 428,898, Jan. 29, 1965. This application Aug. 27, 1965, Ser. No. 487,962
Int. Cl. B02c 7/02, 13/02, 23/02
U.S. Cl. 241—167                                                               14 Claims

ABSTRACT OF THE DISCLOSURE

The reduction of bulky sheet scrap metal to smaller sized pieces is accomplished by a unique shredding mechanism. Due to the relative locations of the relative parts of the mechanism, large sheet scrap is reduced to sizes convenient for immediate charging to a furnace or suitable for balling preparatory to charging to the furnace. A novel conveyor device is provided for delivering the bulk scrap to the shredders. A backhoe is provided in the combination for using in loading scrap to the conveyor as well as for unloading scrap from adjacent vehicles to the conveyor.

---

This application is a continuation-in-part of my co-pending application Ser. No. 428,898 filed Jan. 29, 1965 and entitled "Method and Apparatus for Scrap Metal Reduction," now abandoned.

This invention relates to a method and apparatus for treating scrap material and more particularly to a method and apparatus for shredding unprepared scrap material into a size more satisfactory for furnace charging or satisfactory for subsequent upgrading for furnace charging.

Heretofore scrap metal has been prepared for addition to various melts in a steel mill by crushing scrap material such as old car bodies and the like into relatively compact blocks. A whole car body crushed into one block may measure several feet long by a few feet wide by a foot or two thick. In the old open-hearth or Bessemer processes of making steel, these large blocks were acceptable and usable. In fact, the compactness of the blocks aided in cutting down the bulk of the scrap for storage and shipment before their use in the furnaces.

With the advent of the basic oxygen furnace and the electric furnace, the large blocks of scrap metal could no longer be efficiently used. In order to prevent extinguishing the arc in the furnace and other complications, it was found that it was desirable to add the scrap to the furnace in relatively small masses.

The present invention is directed to a method and apparatus for reducing bulky and light scrap material to a smaller discrete size.

Automobile bodies, washing machines, refrigerator boxes, box car walls ad roofs and the like are fed into improved shredder where the interaction between movable and fixed hammers tears and shreds the bulky scrap material into pieces of discrete sizes; i.e., two feet by three feet, one foot by two feet, two feet by two feet, or the like. The resulting product can be sold as a secondary grade of scrap for furnace consumption or can be up-graded by further processing.

It is, therefore, a principal object of this invention to provide an improved scrap material processing apparatus for shredding bulky scrap material into a size satisfactory for furnace charging.

It is another object of this invention to provide an improved scrap material shredder having stationary shredder platen means positioned in the line of movement of the bulky scrap member for coacting with the movable hammers to produce the shredding effect on the bulky scrap member.

And another object of this invention is to provide an improved scrap metal handling apparatus for reducing the unprepared scrap metal without the need for special scrap metal advancing means into and out of the apparatus.

Another object of this invention is to provide an improved scrap metal handling apparatus which has part of the shredding mechanism used for advancing the scrap metal into and through the apparatus.

Still another object of this invention is to provide an improved scrap metal reducing apparatus having novel means for removing pieces of scrap metal that cling to the hammer elements.

A further object of this invention is to provide an improved scrap metal shredder and platen means that is improved scrap metal handling apparatus having a self-the adjustable depending upon the general gauge of the unprepared scrap being shredded.

A still further object of this invention is to provide an improved scrap metal hadling apparatus having a self-contained power driving mechanism with its own gear reduction mechanism.

And another object of this invention is to provide an improved scrap metal shredding mechanism wherein the hammers are removable and replaceable.

And still a further object of this invention is to provide an improved scrap metal handling method whereby bulky sheet-like scrap metal members are reduced to a smaller, more desirable size.

Still another object of this invention is to provide an improved method and process of treating unprepared scrap metal to produce a product capable of sale at a higher price.

Another object of this invention is to provide an improved means for physically urging the unshredded scrap into the shredding mechanism.

Still another object of this invention is to provide an improved arrangment for receiving unshredded scrap including means for moving said scrap into the shredding mechanism.

A further object of this invention is to provide an improved mechanism mounted on the shredding apparatus which is capable of engaging and moving unshredded scrap into the shredding mechanism.

A further object of this invention is to provide a means capable of lifting unshredded scrap from a wide area surrounding the shredding apparatus and moving said unshredded scrap into close proximity to the shredding mechanism.

And still a further object of this invention is to provide an improved actuating mechanism for tilting a feeder table to gravitate unshredded scrap into a shredding mechanism.

And yet another object of this invention is to provide an improved means and method for moving unshredded scrap from a conveyance through a shredding mechanism to process the scrap for use in a steel making furnace.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and descibed a preferred embodiment of the invention.

Referring more particularly to the drawings wherein similar reference numerals refer to similar parts throughout the several views, the apparatus consists generally of a housing 20 having an opening 21 into which material to be shredded is fed and a discharge opening 22 at the opposite end through which the shredded material is discharged. A prime mover 23 which can be either a diesel engine or an electric motor, is mounted on the housing and is connected through a speed reducer 24 and the gears 25, 26 with the movable hammers 27 in the housing. An external source of power can be utilized without departing from the spirit of my invention. The scrap material is fed along a slope sheet or plate 28 into the path of the movable hammer means 27 within the housing.

No preparation of the bulky scrap for use in my shredder is necessary except that the height of the discrete mass be within reasonable limits, and as an example, an automobile body is generally low enough to fit into the open front of the housing. As long as the scrap material is of a size to fit into the open end of the housing, it is ready for shredding. The buly scrap (i.e., automobile bodies) can be lifted onto the slope sheet or plate 28, and due in part to the vibration of the apparatus, will gradually move into position whereby the movable hammer means 27 will make a pulling contact with the sheet or body to feed said bulky scrap into and through the shredder apparatus.

More specifically, the housing 20 has a pair of spaced apart side walls 29, 30 formed of channeled reinforced plates. The walls 29 and 30 are each divided into two portions, a lower portion 31 and an upper portion 32 with the lower portions 31 each having a flange 33 for anchoring or bolting to the ground or to a base 34 and having a flange 35 for bolting to a flange 36 of the upper portion 32. The upper portions 32 each have a top flange 38 which is bolted to a top member 39. The lower portions 31 each have a cheek plate or shaped supporting member 40 welded or otherwise secured to the inside face thereof with a circular cut-out 42 coinciding with the cut-out 43 formed in the top flanges 35 of said lower portions 31. Each cheek plate 40 has a slot or groove 44 extending horizontaly therein from the fore edge thereof, with the inner end 45 of the groove 44 extending to a point slightly aligned with a point beyond the center line of the cut-out 43 in said lower portion 31. The upper rearward corner of said cheek plate 40 is removed in a horizontally disposed cut-out slot 46. The cheek plates 40 on the inside faces of the walls 29, 30 are fastened in secure engagement with the lower portions 31 of said walls and are mirror images of each other with the grooves 44 and slots 46 aligned with each other across the span of the inside of the housing 20.

Extending betwen the rear portions of the upper portions or plates 32 of the side walls 29, 30 is the reinforced end plate 48 which is bolted with bolts 49 to said walls 29, 30. The reinforced end plate 48 extends in slightly overlapping relationship with the top edge or top surface of the flanges of the lower portion 31 of the side walls 29, 30 at least to the extent of overlapping with the open ends of the slots 46 in the cheek plates 40.

The top member 39 is bolted to the flanges 38 of the side walls 29, 30 and to the top flange 41 of the end plate 48 and is reinforced sufficiently to support the prime mover 23 mounted rigidly thereon. The prime mover 23 can be diesel-type engine capable of sufficient power and speed to drive the shredder to be described hereinafter. The output shaft 53 of the prime mover 23 is connected to the input of the speed reducer 24 with the output 56 of the speed reducer 24 having the wide face gear 25 keyed thereto for rotation therewith. The speed reducer 24 would normally be capable of reducing the speed from the output of the prime mover in the order of something of around 16 to 1. This ratio can be higher or lower depending upon the requirement dictated by the speed of the output of the prime mover and the desired speed for the mechanism being driven.

The bull gear 26 meshing with the face gear 25 is keyed to the shaft 60 which is mounted for rotation about its axis 60 in the bearings 62 seated in the cut-outs 43 in the side walls 29, 30. The bearings 62 could be either roller bearings or sleeve bearings depending upon the demands and preferences of the user of the apparatus.

The movable shredder or movable hammer means 27 (FIGURE 6–11) is composed of the shaft 60 upon which is formed the slightly enlarged center section 64 having threads 65 cut into the opposite end portions thereof. A plurality of hammer mounting members 67 are spaced from each other by spacer members 68 held in face to face contact by the end rings 69 and 70 threaded onto the threads 65 on the shaft 60. The hammer mounting members 67 and spacer members 68 are also keyed to the shaft 60 against relative rotation by means of the key 66 seating in the matching keyholes 71 in the members and in the shaft 60. The hammer mounting members 67 (See FIGURES 7 and 8) have rectangularly shaped cut-out slots 72 radially extending therein and spaced 90° from each other and are adapted to receive in nested relationship the hammers 74, 75, each hammer 74 being spaced 180° from the other matching hammer 74 and each hammer 75 being spaced alternately between said hammers 74. Each hammer 74 (see FIGURE 10) has a base portion 77 with the opening 78 therethrough and has a hammer portion 79 with a tapered hammer edge 80 on the leading edge thereof. The hammers 75 (FIGURE 11) each have a base 81 with an opening 82 therethrough and have an extended portion 83 which is rectangular in shape and longitudinally shorter than the hammer portion 79 on the hammers 74.

The hammers 74, 75 with the openings 78, 82 formed therein are adapted to be positioned in said hammer mounting members 67 with said opening 78, 82, aligned with the openings 84 in the spacer members 68. A rod 85 having a head 86 on one end seated in the recess 87 in the end ring 69 passes through said aligned openings 78, 84 or 82, 84 in the hammers 74, 75 and spacer members 68, respectively, and is bolted by the nut 89 in the recess 90 in the end ring 70. There are four rods 85 in the illustrated embodiment, but it is obvious more or less rods and hammers could be used depending upon the demands of the apparatus.

Figures 6, 7, 8, 9, 10, 11, 12, 13:
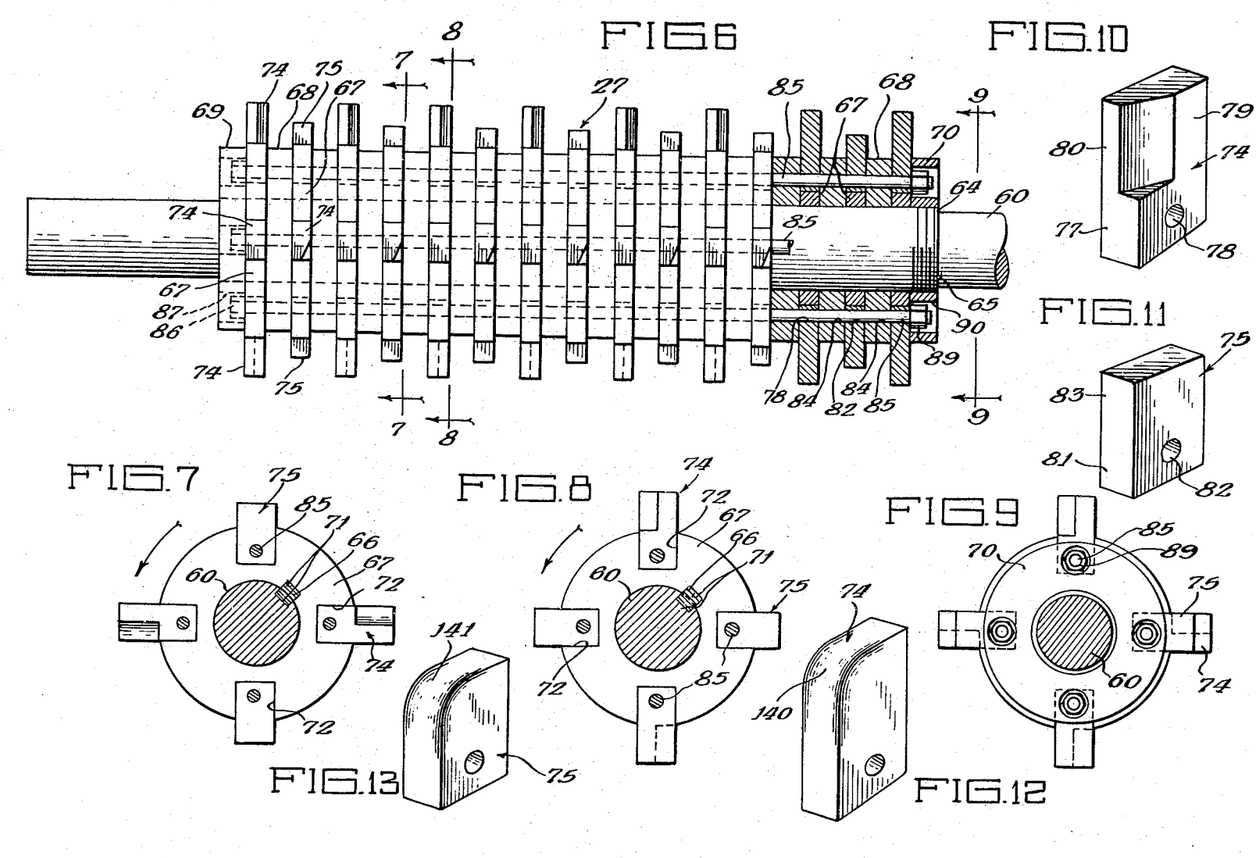
FIGURE 6 is an enlarged view of the movable hammer member partially in section.
FIGURE 7 is a cross sectional view taken on the line 7—7 of FIGURE 6.
FIGURE 8 is a cross sectional view taken on the line 8—8 of FIGURE 6.
FIGURE 9 is a cross sectional view taken on the line 9—9 of FIGURE 6.
FIGURE 10 is a perspective view of one of the hammers of my invention.
FIGURE 11 is a perspective view of one of the holders of my invention.
FIGURE 12 is a perspective view of another form of the hammers of my invention.
FIGURE 13 is a perspective view of another form of the hammers of my invention.

Every other hammer on each mounting member 67 is either a member 74 or a member 75. For instance, starting on the left side of FIGURE 6 a mounting or supporting member 67 will abut against the end ring 69 with a longer hammer 74 extending up and down and with a short hammer 75 extending forward and rearward therefrom. One spacer member 68 abuts against the mounting member 67 on one side and against another mounting member 67 on its other side. The last referred to mounting member 67 has long hammers 74 extending forward and rearward therefrom with short hammers 75 extending upward and downward therefrom. The pattern of hammers, spacers and hammers continues completely across the operative part of the shaft 60 with long hammers 74, 74 on every other hammer mounting member 67 extending upwardly and downwardly from said mounting member 67 with short hammers 75, 75 on every other hammer mounting member between said long hammers extending upwardly and downwardly therefrom. The resulting structure has extending upwardly a long 74, a short 75, a long 74, a short 75 and so on with a short 75, a long 74, a short 75, a long 74 and so on extending forward from the same alternate supporting members 67. FIGURES 7 and 8 illustrate the relative orientation between the short hammers 75 and the long hammers 74 as viewed from the cross sections taken on lines 7—7 and lines 8—8 of FIGURE 6. The short hammers 74 are sometimes referred to as hold-down hammers. It has been found that the front working corners of the hammers 74, 75 can be rounded as shown at 140, 141 in FIGURES 12, 13 respectively without departing from the invention or diminishing its effectiveness.

Figure 1:
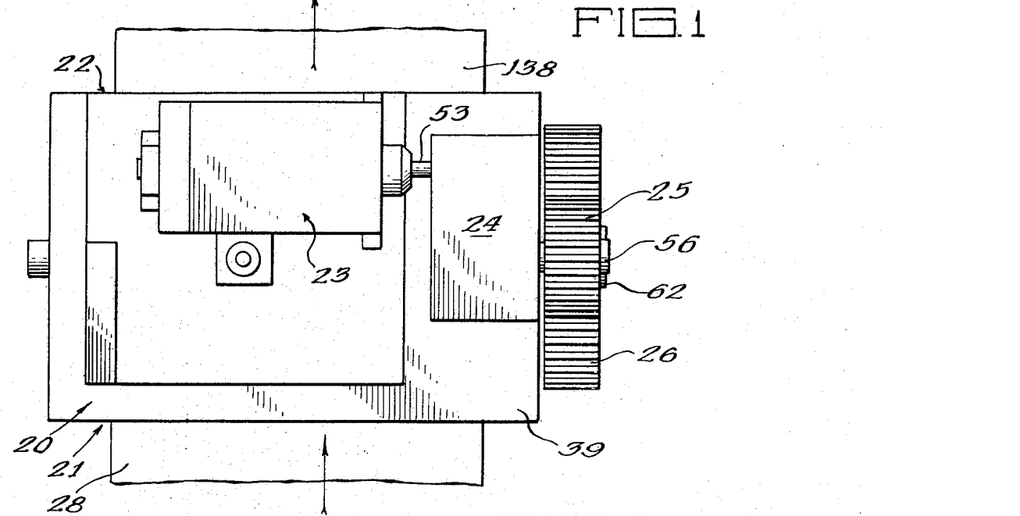
FIGURE 1 is a top view of my apparatus showing the prime mover, speed reducer and gear train in position on the housing.
Figures 2, 5:
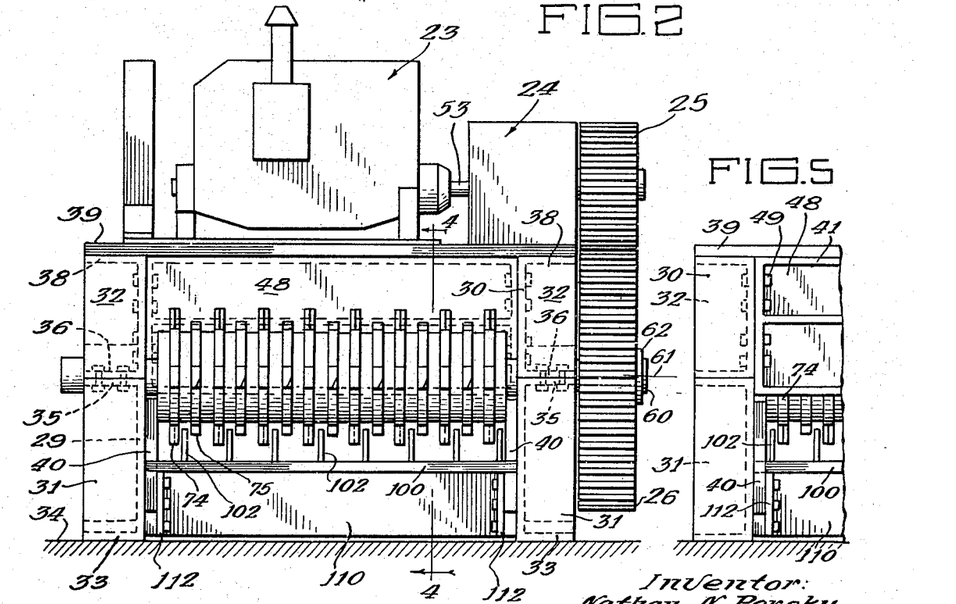
FIGURE 2 is a front view of my apparatus showing the relationship between the movable hammers and the platen member.
FIGURE 5 is a partial rear view of the apparatus showing one corner of the discharge end thereof.
Figure 4:
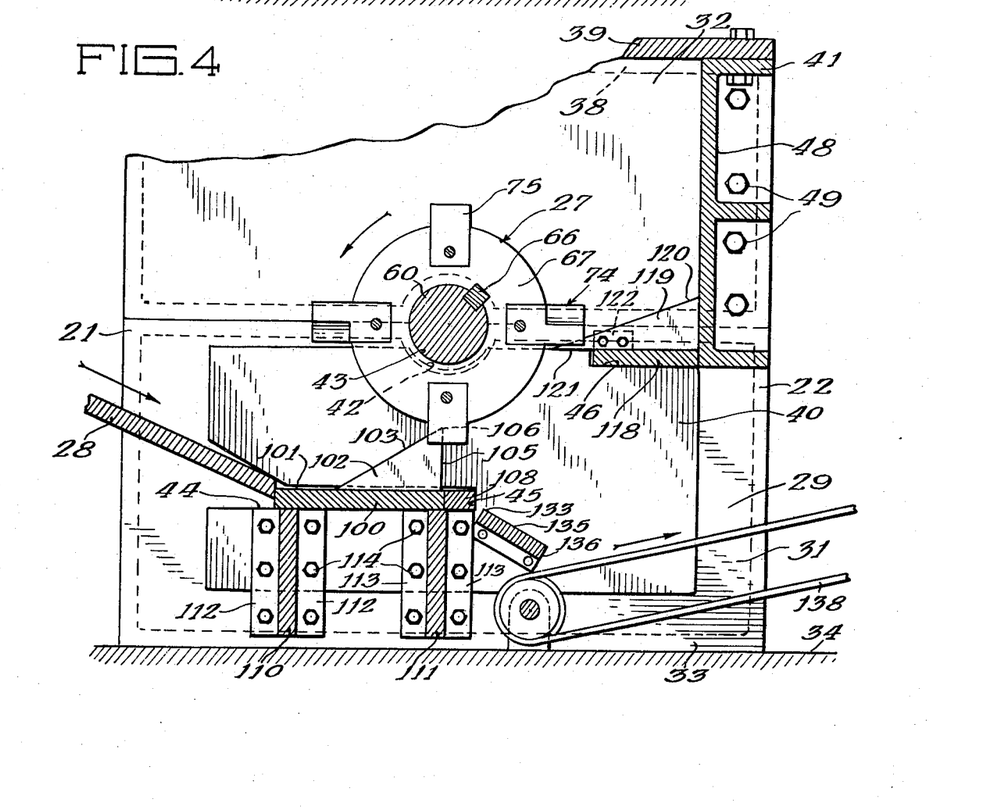
FIGURE 4 is an enlarged sectional view on line 4—4 of FIGURE 2.

The cheek plates 40 secured on the inside of the lower portions 31 of the walls 29, 30 have the grooves 44 extending therein from the open front of the housing into which grooves 44 is slidably received the platen 100 made of a heavy gauge plate extending completely across the width of the housing with the ends thereof nested in said grooves 44. Secured rigidly to the top surface 101 of said platen 100 are a plurality of spaced apart fixed shredder hammers or knives 102 which are each shaped in the illustrated embodiment in triangular form with the hypotenuse 103 of the triangle forming the leading edge of the shredder hammer or lug 102 and a back wall or side 105 of the triangle extending up from said base to an apex 106 forming the high point of said fixed hammers or lugs 102. For certain types of material it has been found that the shredder hammers or knives 102 can have the size of the angle at the apex 106 smaller so that the hypotenuse 103 will approach a horizontal position whereby the hammers or lugs 102 will become substantially square or rectangular in shape as viewed from the side, FIGURE 4. The angle of the apex 106 can vary from 60° toward 0° depending on the material. The hammers 102 are mounted on the platen 100 in the same overlapping, intermeshing relationship presently used with the triangular hammers. For illustration of one form of my invention, in FIGURE 2 a lug or finger 102 extends upwardly between the first and second hammer support members 67, between the third and fourth hammer support members 67 and so on across the width of the shaft 60. As has been described, the grooves 44 extend into the housing to a point beyond the center of the shaft. It has been found that for heavier gauge material the platen 100 will give better results if moved further forward in the grooves 44 so that the apex 106 of the lugs 102 will be forward of the center of the shaft. For lighter gauge material the platen 100 is moved rearward of the center of the axis of the shaft 60 and is blocked into that position by inserting selected plugs 108 in the grooves 44 in front of said plate 100 of the platen so as to prevent the plate 100 from moving farther forward in the housing. To produce larger pieces of scrap than is possible with the hammers or knives 102 spaced apart as illustrated in FIGURE 2, it is possible to remove every other hammer 102 which will eliminate every other shredder operation, thus producing wider pieces of scrap.

To assist in supporting the platen across the width of the housing, a pair of spaced apart channel members 110 and 11 having end flanges 112, 113 respective are bolted to the cheek plates 40 and sides 29, 30 by means of bolts 114. The channels 110 and 111 support the front and rear of the platen 100 against deflections or bending downwardly. The platen 100 with the fixed hammers 102 can be removed from its operative position in the housing for repair or replacement without the need for major tear down of the machine.

Mounted in the slots 46 in said cheek plates 40 is a clean-out member or plate 118 extending completely across said housing near and above the discharge end thereof. Rigidly secured to the upper surface of said plate 118 is a plurality of spaced apart clean-out lugs or dogs 119, each one having a hypotenuse 120 joining with the mounting side of said dog 119 at an apex 121 extending forwardly of the plate 118 and into overlapping relationship with the hammers 74, 75. An abutment member 122 is bolted to each lower portion 31 of the walls 29, 30 just above the slots 46 in the cheek plates 40 so as to hold the fore portion of the clean-out plate 118 against movement upward relative to the cheek plate 40. The apex 121 of dogs 119 extends almost to the spacer members 68 and are positioned between the hammers 74, 75 on the first and second supporting elements 67, third and fourth supporting elements 67, and so on, just the same as the fixed hammers 102 on the platen 100. Therefore, a clean-out dog 119 is positioned near the discharge end of the housing in position between the same hammers as the fixed hammers 102 so as to dislodge any material from the hammers that might be stuck thereto during the shredding operation.

The end plate 48 acts as a back-up plate for the clean-out plate 118 and dogs 119 and is readily removable for replacing or repairing of said clean-out plate and lugs. A substantial opening 22 exists between the sides 29, 30 and below the end plate 48 and above the base 34 upon which the device is mounted. The opening 22 acts as the discharge end of the device.

Between the sides 29, 30 and having its high end 133 aligned with the discharge end of the platen 100 is a slope sheet 135 sloping downwardly and away from said platen 100. The lower end 136 of said slope sheet is spaced some distance from the mounting base such that a portable off-bearing conveyor 138 can be inserted into the discharge end of the housing and under the end 136 of the slope sheet 135. In this way shredded material coming from the shredder or dislodged by the clean-out lugs drops down onto the slope sheet and onto the conveyor 138 which conveys the material either to a subsequent operation, to storage, to a truck, to a railroad car or some such follow-on equipment.

Figure 3:
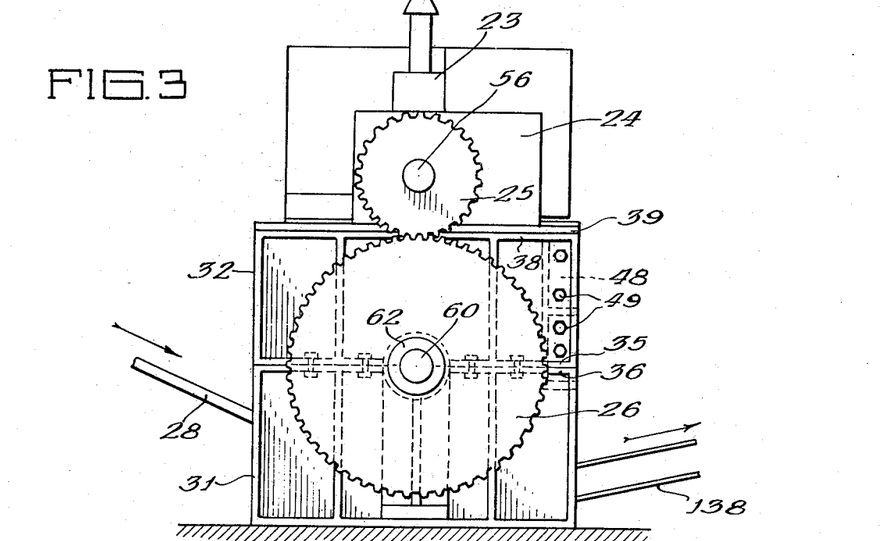
FIGURE 3 is a side view of the apparatus showing the gear train.

In use, relatively large sheets, i.e., six by ten or seven by twelve of scrap (for instance, automobile bodies) are fed onto the slope sheet 28 at the entrance to my shredder. The prime mover 23 is running so that the movable hammers on the shredder are rotating about the axis of the shredder at a speed of approximately 15 r.p.m.'s in a counterclockwise direction, as viewed in FIGURES 3 and 4. The scrap material is moved into the entrance of the housing until the first of the movable hammers 74, 75 grabs the material and pulls it into and over the stationary or fixed hammers or lugs 102. As will be noted in FIGURE 4, one long movable hammer 74 is next to one fixed hammer or lug 102 with a short movable hammer 75 next to said fixed hammer or lug 102 on its other side. A short distance along the axis of the shredder a repeat pattern of a long hammer 74, a fixed hammer or lug 102 and a short hammer 75 exists. As the shredder rotates 90°, the pattern will be reversed, namely, a short hammer 75, the fixed hammer or lug 102 and a long hammer 74 and so on across the shredder. With these patterns the scrap material is pulled by brute strength by the movable hammers 74, 75 onto the fixed hammers or lugs 102 so as to rip and tear the scrap material into smaller pieces. Since the car body may be two or more layers thick of scrap material, each layer will be torn simultaneously with its overlapping layer into the desirable smaller pieces. Sometimes in the tearing process some pieces of scrap material will be lodged between hammers 74, 75 or might even have a hammer punched therethrough and stuck thereon. The clean-out knives or lugs 119 are positioned relative to the hammers 74, 75 and to the mounting element 67 such that the lugs 119 will engage with and strip off any adhering material. The dislodged pieces and the shredded pieces all drop down the slope sheet 135 onto the conveyor 138 whereupon they are conveyed to subsequent equipment. The short hammers 75 act as holddown members and position the scrap over the fixed hammers 102 while the movable hammers 74 push through the material and drag it past the intervening fixed hammers as it shreds it into smaller pieces.

The square or rectangular hammers 102 present a flat or blunt surface to the scrap as the movable hammers sweep down onto the scrap and pull it into and past the blunt surface of the fixed hammer to tear and shred the material. The blunt surface is more effective with certain types of material.

In practice, it has been found that due to the spacing of the movable short and long hammers 74, 75 relative to the stationary or fixed hammers or lugs 102, tears and rips the material lengthwise for a short distance and then due to the change of relationship of the short and long hammers, one portion of the material is stretched and pulled more than another portion, thereby tearing the pieces crosswise also. In this way not only narrow sheets are produced, but also short sheets. The smaller pieces of scrap material are extremely desirable for subsequent processing of the scrap for use in the steel making industry.

Another desirable result of the ripping, tearing, stretching and pulling of the scrap material is the cleaning of the material that takes place in the process. Any scrap with porcelain coating is generally considered of low grade and unusable for high grade steel making. With my working of the material in the shredder, the porcelain is stripped off the base metal making the metal usable for steel scrap. The stretching, tearing, pulling and ripping of the porcelainized material loosens the porcelain and it pops off, leaving the base metal clean and usable. The same principle applies to many other types of scrap whereby now it is possible to recover and use large amounts of scrap that were previously considered unusable due to coatings or other types of surface treatments.

Figure 14:
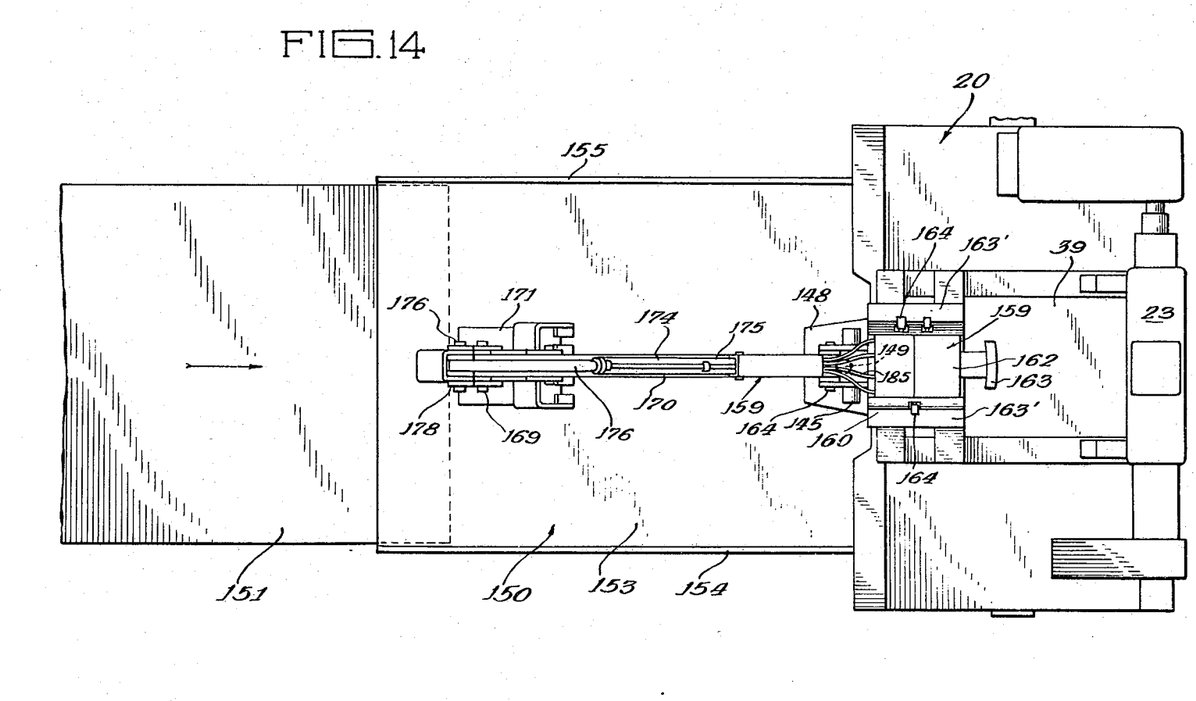
FIGURE 14 is a top plan view of the shredding and feeding apparatus whereby unshredded material is fed into the shredding mechanism.
Figure 15:
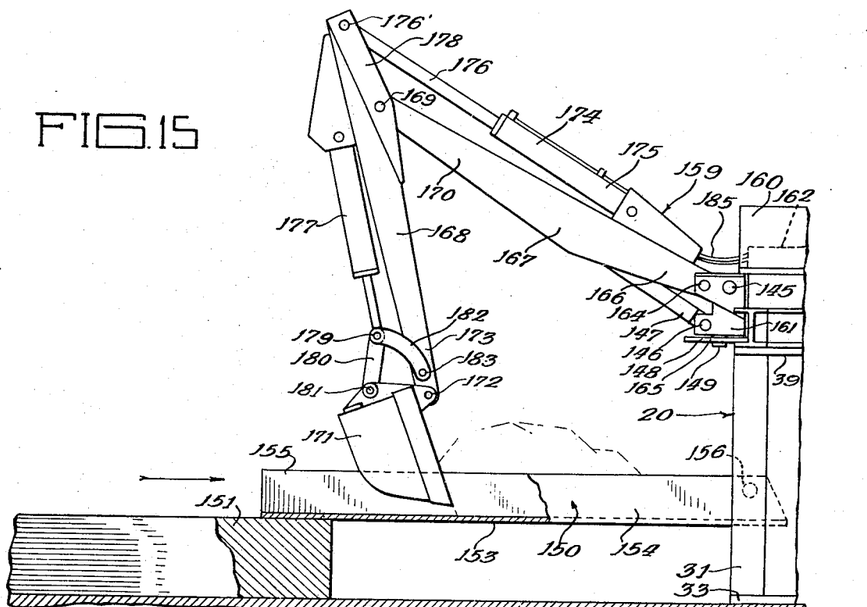
FIGURE 15 is a side elevational view of a portion of the invention shown in FIGURE 14.

A further modified form of my invention is shown in FIGURES 14 and 15 wherein one means for moving unshredded scrap into position to be shredded by the shredding mechanism is shown. Specifically, a loading box or feeder table 150 is mounted on the vertical side walls 31 and 32 of the housing 20 and extends from the housing 20 to a loading ramp 151. The feeder table 150 is comprised of a base plate 153 which is approximately the same width as the entrance opening 21 in the housing 20. A pair of side walls 154, 155 are formed with the base 153 and extend transversely upward from the side edges thereof. The table 150 may be fixed to the housing 20 or may have a pair of pins 156 passed through the side walls 154, 155 of the feeder table 150 and engaged with the walls 31, 32 of the housing 20 to make the feeder table 150 pivotally mounted to the housing for certain uses and applications. It is contemplated that the feeder table 150 may have its outer end 156 resting upon the tailgate of a truck, or aligned with an opening into any conveyance containing unshredded scrap material whereupon the unloading mechanism hereinafter described may engage the scrap and move it onto the feeder table 150 and into the shredding mechanism.

Mounted on the top surface or top member 39 of the housing 20 is a loading apparatus or backhoe 159. Specifically, the loading apparatus or backhoe 159 has a mounting base 160 bolted or in some other way secured upon the top plate 39 of the housing. The base 160 can be mounted on I-beams or other supporting structures to provide the proper height and working position for the loading apparatus or backhoe 159. The specific mounting of the loading apparatus to the housing 20 does not form a detailed part of this invention. The base 160 contains a hydraulic driving mechanism (not shown) which is connected in an appropriate fashion with the prime mover or diesel engine 23 on the housing. The base 160 does not move relative to the housing 20 and has a heat 162 including a back 163 facing toward the feeder table 150 upon which an operator is located during operation of the actuating apparatus or backhoe 159. Appropriate levers 164 are positioned on either side of the seat 162 in arm rests 163' in a convenient location for the operator to manipulate one or the other or both in working the loading apparatus or backhoe 159 as a feeding or loading mechanism.

The base 160 has a mounting foot or depending portion 165 rigidly carried by the lower front edge of the base. A supporting bracket 161 is pivoted on the depending portion 165 about a vertical pivot 149 upwardly extending from the floor 148 of said portion 165. Pivotally mounted to the supporting bracket 161 about a horizontal pivot 164 is one end 166 of a boom 167. An actuating arm 168 is pivoted at 169 to the outer extended end portion 170 of the boom 167. A paw or bucket 171 is pivoted at 172 to the lower or extended end portion 173 of the arm 168.

A hydraulic actuator 147 is pivoted by pin 146 to the bracket 161 and has its other end pivoted to the boom 167. A hydraulic actuator 174 has a fixed end 175 mounted near the pivoted end 166 of the boom 167 and has its movable end 176 pivoted at 176' to an extended portion 178 of the arm 168. A further hydraulic actuator 177 is carried by the arm 168 and has one end fixed to the portion 178 of the arm and has its other end pivoted by pin 179 to one end of a link 180. The other end of said link 180 is pivoted at 181 to one side of the paw or bucket 171. The end of the hydraulic actuator 177 is also pivotally supported by the pin 179 to one end of the arcuate supports 182 which are pivotally fastened near the other end to the outer end portion 173 of the arm 168 by a pin 183.

Within the base 160 is a hydraulic pump and control system (not shown) which is driven by the prime mover or diesel engine 23. A plurality of flexible pipes 185 extend from the hydraulic pump in the base 160 to the actuating pistons 147, 174, 177 so that on appropriate manipulation of the levers 164, the boom 167 and arm 168 of the actuating apparatus or backhoe 159 can be moved outwardly or inwardly with respect to the housing 20. The paw or bucket 171 can be pivoted about the pin 172 so as to engage or gather scrap within its reach and pull or drag it toward and into the shredding mechanism. The boom 167 and associated parts are adapted to be swung about the vertical axis of the pivot 149 by means of the actuators 146 such that the boom 167, arm 168 and bucket 171 can sweep through a 180° arc from one side to the other of the base 160 and housing 20.

The paw or bucket 171 in its illustrated form is an open type bucket member; however, in a modified form a fixed plate (not shown) could be carried by the end of the arm 168 in overlapping relation with the mouth of the bucket so that scrap could be gripped between the fixed plate and the pivoted portion of the bucket 171 whereupon the scrap can be lifted from the ground or from a surround surface and carried to and deposited upon the feeder table 150.

In use, the backhoe bucket 171 is moved out of line with the ramp 151 and feeder table 150. A dump truck or the like loaded with scrap is backed up the ramp and dumps a load of scrap onto the feeder table. The boom 167 and arm 168 of the backhoe are then swung into position with the bucket 171 engaging with portions of the scrap and moving same along the feeder table until the shredder elements engage with portions of the scrap to pull the scrap into and through the shredding mechanism. Repeated movements of the bucket 171 can dispense or transmit large quantities of scrap into the shredder of the shredding mechanism in a very short time. Additional loads of scrap can be dumped on the feeder table while the bucket is moving scrap in close to the shredder elements so that there is always a source of unshredded scrap to be moved by the loading apparatus or backhoe into the shredder.

With the bucket modified to include the fixed plate, the backhoe can be used to lift scrap out of flat cars or gondolas parked close to the shredding mechanism or can pick scrap off the ground and lift it on to the feeder table for urging into the shredder.

Figure 16:
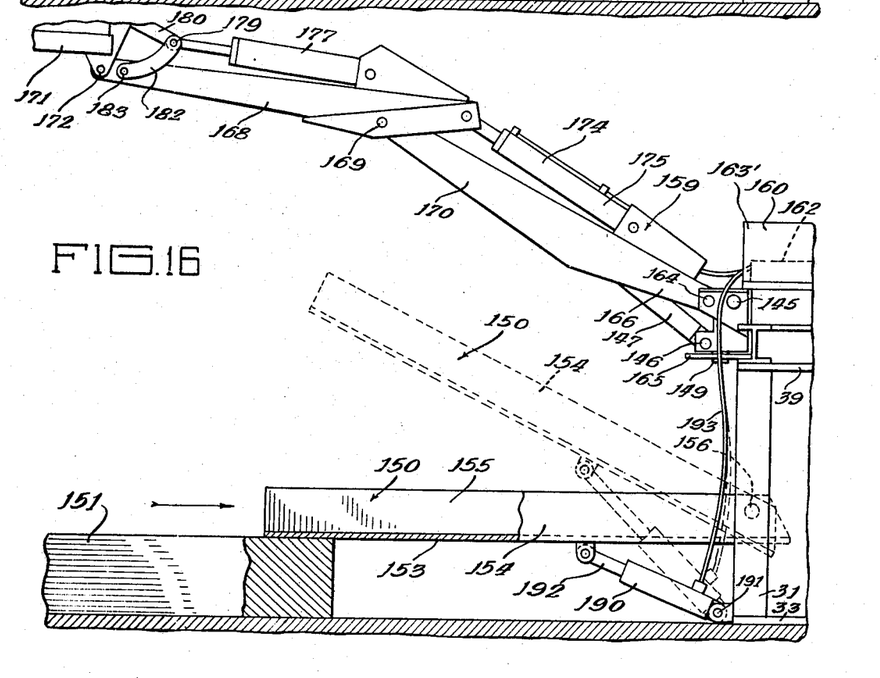
FIGURE 16 is a side elevational view of a modified form of the invention shown in FIGURES 14 and 15.

In FIGURE 16 an additional feature of my invention is shown wherein hydraulic cylinders 190 are mounted at 191 on the base 33 of the shredder housing 20 and have the extended portion 192 thereof engaging with the underside of the feeder table 150. The hydraulic actuator 190 is connected through tubing 193 with the hydraulic pump of the backhoe. Upon actuating the cylinder 190 the outer end 156 of feeder table 150 would be raised as the table is pivoted about the pins 151 so that any scrap on the table would be fed by gravity down the table and into the shredding mechanism. Both the backhoe and the pivoted table feed could be simultaneously used to feed, the material into the shredders, although it is contemplated that either one or the other method will be used at any one time.

With my improved loading apparatus or backhoe mechanism in combination with the shredding mechanism, I have improved the versatility of my machine so that it is no longer necessary for individuals to hand feed scrap into the shredding mechanism. It has been found that due to the nature of unshredded scrap, injury to the individuals feeding scrap into the shredder was potentially high. In fact, series injury either by flying pieces of scrap or by jagged edges catching or tearing operators was a possible hazard to the parties hand feeding the scrap. With the operator now located above the shredders and out of the line of action of the scrap being pulled into the shredders or pieces flying from the scrap as it is shredded, virtually no injury to the operator is possible. The operator using the backhoe can feed unshredded scrap to the mechanism much faster and more efficiently since the machine does not have to be shut down for a rest. Previously the hand feeders had to regularly rest from their chores of lifting and moving scrap into the shredder. The versatility of the feeder mechanism is such that any scrap within the reach of the backhoe can be moved into the shredders without the need for manually lifting or manually moving the scrap. This materially increases the usefulness of the machine.

I have illustrated and described one of the best forms of embodiment of my invention now known to me. It will be apparent to those skilled in the art that changes may be made in the forms of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. In a device for treating scrap material, a slope plate for feeding material into the open end of a housing, a plurality of horizontal rows of axially and circumferentially spaced apart movable hammer means rotatably mounted in said housing in the path of travel of said material, at least one horizontal row of hammer means having alternately a long hammer means and a short hammer means, the circumferentially adjacent horizontal row of hammer means having alternately a short hammer means and a long hammer means, stationary hammer means mounted in the housing in intermeshing operative relationship with the movable hammer means, and means for driving said movable hammer means about an axis lying transverse to the path of movement of the material through the housing whereby material passing between said movable and stationary hammer means will be torn into smaller pieces.

2. A device as claimed in claim 1 wherein a cylindrically shaped member forms the element upon which the movable hammer means are mounted, and means for removably mounting said long hammer means and said short hammer means on said cylindrically shaped member whereby replacement of said hammer means can be effected.

3. A device as claimed in claim 2 wherein knife means extend inwardly from the rear of the housing into intermeshing relationship with the movable hammer means for clearing material adhering to said cylindrically shaped member.

4. In a device for treating scrap material, a housing having aligned open front and rear portions, a cylindrical member rotatably mounted in the housing in the path of travel of material into the open front portion of the housing, a plurality of horizontal rows of circumferentially spaced apart movable hammer means mounted on said cylindrical member, at least one horizontal row of hammer means having first a long hammer means and then a short hammer means spaced axially therefrom, the circumferentially adjacent horizontal rows of hammer means having first a short hammer means and then a long hammer means, a platen extending across the path of travel of said material and having a plurality of spaced apart stationary hammer means mounted thereon in intermeshing operative relationship with the movable hammer means, and means for driving said cylindrical member and said movable hammer means about an axis lying transverse to the path of movement of the material with the movable hammer means coming downward and sweeping rearwardly between said stationary hammer means whereby material passing between said movable and stationary hammer means will be torn into smaller pieces.

5. A device as claimed in claim 4 wherein knife means extend inwardly from the rear portion of the housing into intermeshing relationship with the movable hammer means for clearing material adhering to said movable hammer means and said cylindrically shaped member.

6. A material shredding machine comprising a housing having aligned open front and rear portions, movable hammer means having long hammer elements and short hammer elements rotatably mounted within said housing, stationary hammer means mounted in said housing in meshing relationship with said long hammer elements and said short hammer elements of said movable hammer means, said stationary hammer, means comprising a plurality of upwardly projecting plates having an angularly inclined forward surface, said inclined surface facing in the direction from which the material to be shredded approaches, means for driving said movable hammer means in an arcuate path downwardly and rearwardly past said inclined surface on said stationary hammer means whereby material entering the open front portion of the housing will be grabbed by said movable hammer means and dragged through and over and between said stationary hammer means to reduce the size of said material that will emerge from the open rear portion of the housing, and means mounted on the rear portion of the housing and extending into operative position with respect to said movable hammer means for stripping material clinging to said movable hammer means therefrom.

7. A device for shredding scrap material comprising a housing, means rotatably mounted within said housing, movable hammer means operatively associated with said first named means, said movable hammer means having long hammer elements and short hammer elements thereon, stationary hammer means positioned in said housing in meshing relationship with said movable hammer means, and means for driving said first named means so that said short hammer elements on said movable hammer means hold the scrap material relative to said stationary hammer means as said long hammer elements, on said movable hammer means sweep in an arcuate path downwardly and rearwardly between said stationary hammer means whereby material fed into the sweep of said movable hammer means will be forced through the area of the stationary hammer means for tearing and shredding said material.

8. A device for shredding scrap material comprising a housing, means rotatably mounted within said housing, first hammer means mounted on said means for rotatable movement therewith, said first hammer means comprising alternate long hammer elements and short hammer elements, stationary hammer means positioned in said housing in operative position with said first hammer means, means for driving said first named means so that said short hammer elements holds said material relative to said fixed hammer means as said long hammer elements of said first hammer means sweeps in an arcuate path downwardly and rearwardly between said stationary hammer means whereby material fed into the sweep of said movable hammer means will be forced through the area of the stationary hammer means for tearing and shredding said material, and means positioned beyond the area of the stationary hammer means for removing material that clings to said first named means.

9. In a device for shredding scrap material, a housing, a slope plate carried by the housing for directing scrap material into the housing, a cylindrically shaped means rotatably supported within said housing, means carried by said housing for driving said cylindrically shaped means, a plurality of long and short hammer means fixed on said cylindrical means and projecting radially outward from the surface thereof for movement with said cylindrically shaped means, a platen positioned on said housing slightly below the outer reaches of said long hammer means, stationary hammer means carried by said platen and extending upwardly into overlapping relationship with the long and short hammer means as said hammer means pass through the lower sweep of movement, the most remote end of said stationary hammer means being positioned a short distance from the base of said long and short movable hammer means whereby the scrap material will be held by said short hammer means and said stationary hammer means and will be shredded between said long movable hammer means and said stationary hammer means.

10. In a device for shredding scrap material, a housing, means for feeding scrap into said housing, a cylindrically shaped means rotatably supported within said housing in the path of said scrap, a plurality of long and short hammers projecting from said cylindrically shaped means, a platen lying parallel to and spaced slightly below the outer reaches of said long hammers, stationary hammer means fixed on said platen and extending upwardly into overlapping relationship with said long and short hammers, the remote end of said stationary hammer means being positioned a short distance from the base of said long and short hammers, means for removing said stationary hammer means, means for driving said cylindrical means relative to said stationary hammer means on said platen, and knife means mounted on said housing and extending into overlapping relationship with the hammers on said cylindrical means on the side of said housing remote from the scrap feeding part of the housing whereby the scrap will be shredded between said hammers on said cylindrical means and said stationary hammer means with the shredded material that clings to said cylindrical means being pulled loose by said knife means.

11. In a device for treating scrap material, a housing means for feeding scrap material into the open end of said housing, cylindrical means having a plurality of horizontal rows of hammer means circumferentially spaced apart from each other thereabout, said cylindrical means being mounted in said housing in the path of travel of said material, at least one of said horizontal rows of hammer means having alternately a long hammer means and a short hammer means thereacross, the circumferentially adjacent horizontal rows of hammer means having alternately a short hammer means and a long hammer means, means for replacing one or more of said movable hammer means, stationary hammer means mounted in the housing in intermeshing operative relationship with the movable hammer means, means for removing said stationary hammer means, and means for driving said cylindrical means and said movable hammer means about an axis lying transverse to the path of movement of the material through the housing whereby material passing between said movable and stationary hammer means will be torn into smaller pieces.

12. A device as claimed in claim 11 wherein knife means extend inwardly from a rear wall of the housing into intermeshing relationship with the movable hammer means for clearing material adhering to said movable hammer means and said cylindrical means.

13. A scrap material treating apparatus having a housing, means carried by the housing for shredding scrap fed into the housing, pivoted means on said housing for feeding said scrap into said housing, said pivoted means comprising a feeding table, a base portion carried by said housing, means movably mounted on said base portion and extending outwardly from said housing into overlapping relation with said feeding table, bucket means carried by said movably mounted means adapted to engage with scrap on said feeding table and means for moving said bucket means and said movably mounted means for urging scrap along said feeding table and into said shredding means.

14. A scrap material shredding apparatus having a housing, shredding means in the housing for shredding scrap fed into the housing, and means for feeding scrap into said shredding means comprising a backhoe mechanism having a base portion mounted on the housing generally above said shredding means, said backhoe mechanism having a power operated articulated boom pivotally mounted on said base portion, bucket means carried by the outer end portion of said boom, and means for operating said boom and bucket means for urging scrap into said shredding means in said housing.

References Cited

UNITED STATES PATENTS

| | | | |
|---|---|---|---|
| 1,920,946 | 8/1933 | Armstrong | 241—194 |
| 2,026,790 | 1/1936 | Mankoff | 241—194 |
| 3,111,248 | 11/1963 | Pierson | 241—190 X |
| 3,170,642 | 2/1965 | Haidler | 241—190 X |
| 3,202,369 | 8/1965 | Judd | 241—190 |
| 1,632,341 | 6/1927 | Koch | 241—186 |
| 2,264,204 | 11/1941 | Heckett | 241—76 X |
| 2,858,082 | 10/1958 | Beiling | 241—186 |
| 3,283,698 | 11/1966 | Williams | 100—97 |

FOREIGN PATENTS 27,275    5/1932    Netherlands.

FRANK T. YOST, Primary Examiner

U.S. Cl. X.R.

241—186, 190, 194, 195, 222, 243